Nov. 15, 1938.  T. W. KEETEN  2,136,975
TRACTOR WHEEL LUG CHAIN
Filed June 14, 1937
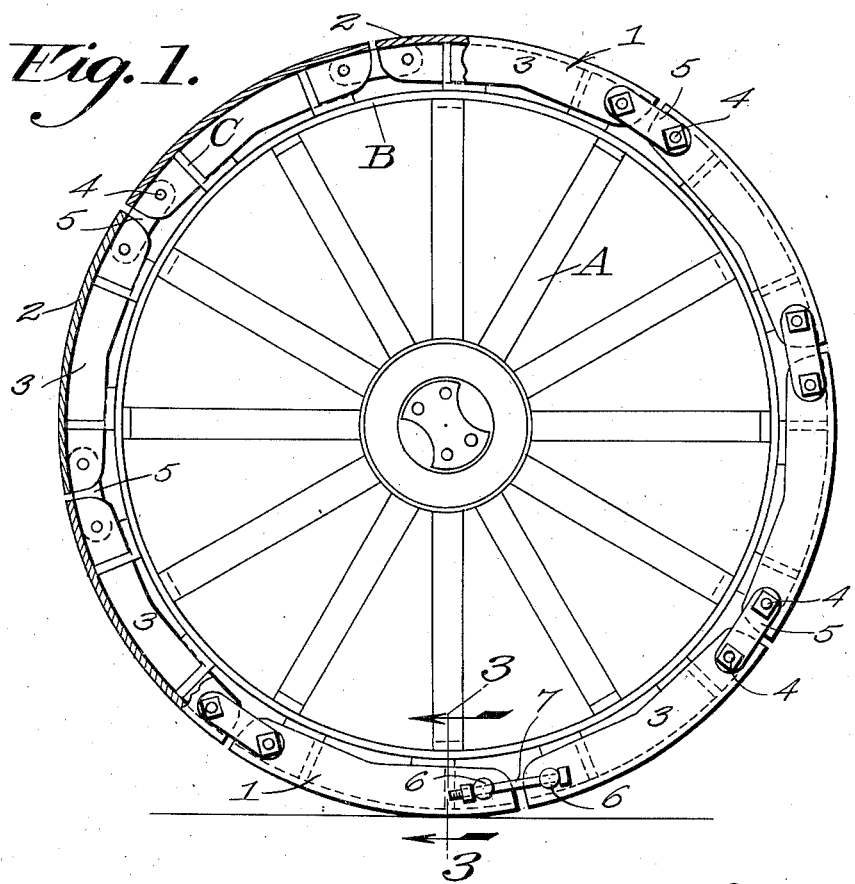
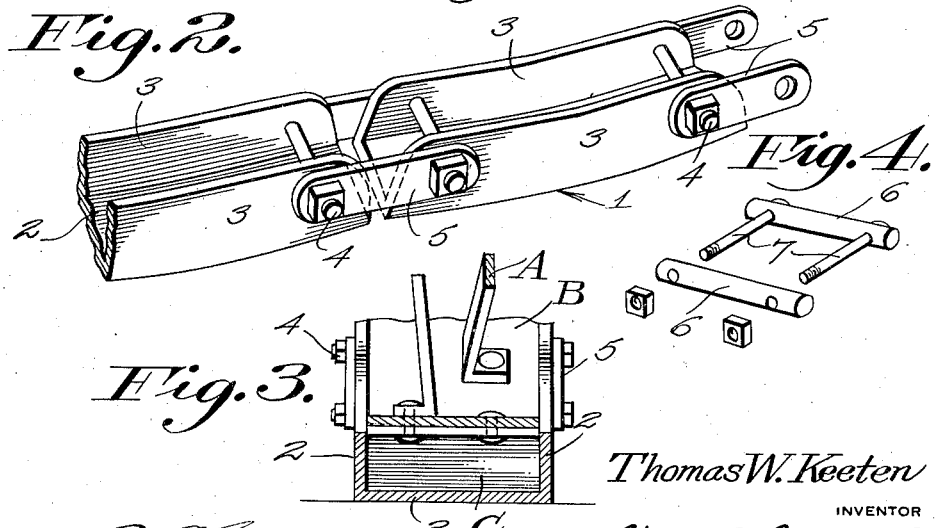
Thomas W. Keeten
INVENTOR Patented Nov. 15, 1938

2,136,975

UNITED STATES PATENT OFFICE 2,136,975

TRACTOR WHEEL LUG CHAIN

Thomas W. Keeten, Glade, Kans.

Application June 14, 1937, Serial No. 148,238

1 Claim. (Cl. 301—40)

This invention relates to tractor wheel attachments, and its general object is to provide what may be termed a chain in the form of a shield for disposal about a tractor wheel to enclose and cover the traction lugs, cleats, etc. thereof, so as to not only protect the same against damage and premature wear, but my chain provides a smooth ground engaging surface and prevents the lugs from digging into concrete, paved and other hard surfaces when driving the tractor upon highways and the like.

A further object is to provide a tractor wheel lug chain, of the character set forth, that can be applied and removed with respect to the wheel, in an easy and expeditious manner, and includes connecting means for drawing the chain taut about the wheel and the lugs thereof.

Another object is to provide a tractor wheel lug chain, that can be conveniently carried on the tractor for immediate use when desired, and the chain is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a view illustrating my chain applied to a tractor wheel with parts broken away and in section.

Figure 2 is an enlarged detail fragmentary perspective view and clearly illustrates the chain sections or lug shields.

Figure 3 is a sectional view taken approximately on line 3—3 of Figure 1.

Figure 4 is a detail perspective view of the connecting means for securing and drawing the chain in taut condition about the wheel.

Referring to the drawing in detail, the letter A indicates a tractor wheel of a well known construction, and which includes a rim or tire B, having angle lugs C secured thereto.

My chain includes a plurality of sections or shield members 1, each having an outer wall 2 providing a smooth tread surface, and side flanges 3 formed on the outer wall and extending inwardly therefrom in parallel relation with respect to each other.

The sections are slightly curved longitudinally throughout their length to follow the curvature of the rim of the wheel, and the flanges are provided with registering openings for the purpose of receiving bolts of bolt and nut connections 4, the bolts extending through pairs of links 5 for pivotally associating the sections with respect to each other, in chain formation, and the links are preferably arranged exteriorly of the flanges, as shown. The links are of a length to space the sections a sufficient distance apart to allow for free relative movement thereof with respect to each other. It will be noted that the confronting ends of the flanges are inclined inwardly from their connection with the walls 2 thereof and the outer corners of the flanges are rounded.

It will be noted from Figure 1 that the chain is disposed about the wheel, with the lugs enclosed by the sections thereof, and the chain is secured accordingly by pins 6, to be used in place of two of the bolt and nut connections 4, the pins having openings in the outer ends thereof to receive bolts of bolt and nut connections 7. By that construction, it will be obvious that the chain can be drawn taut about the wheel merely by threading the nuts of the bolt and nut connections 7 inwardly on their bolts.

The sections are shown as being substantially rectangular or elongated in formation, but I want it understood that it can be of any length and shape, providing they enclose the lugs and include a smooth ground engaging or tread surface, to protect the lugs against damage and premature wear as well as to prevent the same from digging into hard surfaced roadways, as previously set forth.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A tractor wheel lug chain comprising lug enclosing sections, each including an outer wall providing a smooth tread surface, flanges formed on the outer wall and extending inwardly therefrom in parallel relation with respect to each other, links pivotally connected to the flanges for connecting the sections together for relative movement in chain formation, said flanges having inwardly inclined outer ends and rounded outer corners, means for detachably securing the chain to the wheel, and said detachable securing means including a pair of pins for disposal through the confronting end portions of the flanges of two sections and having openings in the ends thereof, and headed bolt and nut connections having the bolts extending through the openings of the pins and cooperating with the nuts for drawing the chain taut about the wheel.

THOMAS W. KEETEN.